(12) United States Patent
Hirata

(10) Patent No.: US 10,965,821 B2
(45) Date of Patent: Mar. 30, 2021

(54) INFORMATION PROCESSING APPARATUS AND SYSTEM AND NON-TRANSITORY COMPUTER READABLE MEDIUM

(71) Applicant: FUJI XEROX CO., LTD., Tokyo (JP)

(72) Inventor: Motoharu Hirata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 410 days.

(21) Appl. No.: 15/913,341

(22) Filed: Mar. 6, 2018

(65) Prior Publication Data
US 2019/0082059 A1 Mar. 14, 2019

(30) Foreign Application Priority Data
Sep. 14, 2017 (JP) .............................. JP2017-176825

(51) Int. Cl.
*H04N 1/00* (2006.01)

(52) U.S. Cl.
CPC ..... *H04N 1/00079* (2013.01); *H04N 1/00042* (2013.01); *H04N 1/00068* (2013.01); *H04N 1/00344* (2013.01)

(58) Field of Classification Search
CPC ........... H04N 1/00079; H04N 1/00068; H04N 1/00042; H04N 1/00037; H04N 1/00344
See application file for complete search history.

(56) References Cited

U.S. PATENT DOCUMENTS

| 2005/0071029 A1* | 3/2005 | Yamamoto | G06Q 10/06 700/97 |
| 2007/0078553 A1* | 4/2007 | Miwa | G06F 30/00 700/97 |
| 2019/0018397 A1* | 1/2019 | Shiba | G05B 19/418 |

FOREIGN PATENT DOCUMENTS

| JP | H10-216689 A | 8/1998 |
| JP | 2002-361527 A | 12/2002 |
| JP | 2008-065639 A | 3/2008 |

* cited by examiner

*Primary Examiner* — Moustapha Diaby
(74) *Attorney, Agent, or Firm* — Oliff PLC

(57) ABSTRACT

An information processing apparatus includes first and second estimators and a determining unit. The first estimator estimates a quality of each individual part to be used for a product, based on error information concerning a manufactured product. The second estimator estimates a degree of an influence of each portion of a product on a quality of the product, based on the error information. The determining unit determines, for each portion of the product, which part will be used for a corresponding portion of the product, based on the estimated quality and the estimated degree of an influence.

17 Claims, 20 Drawing Sheets

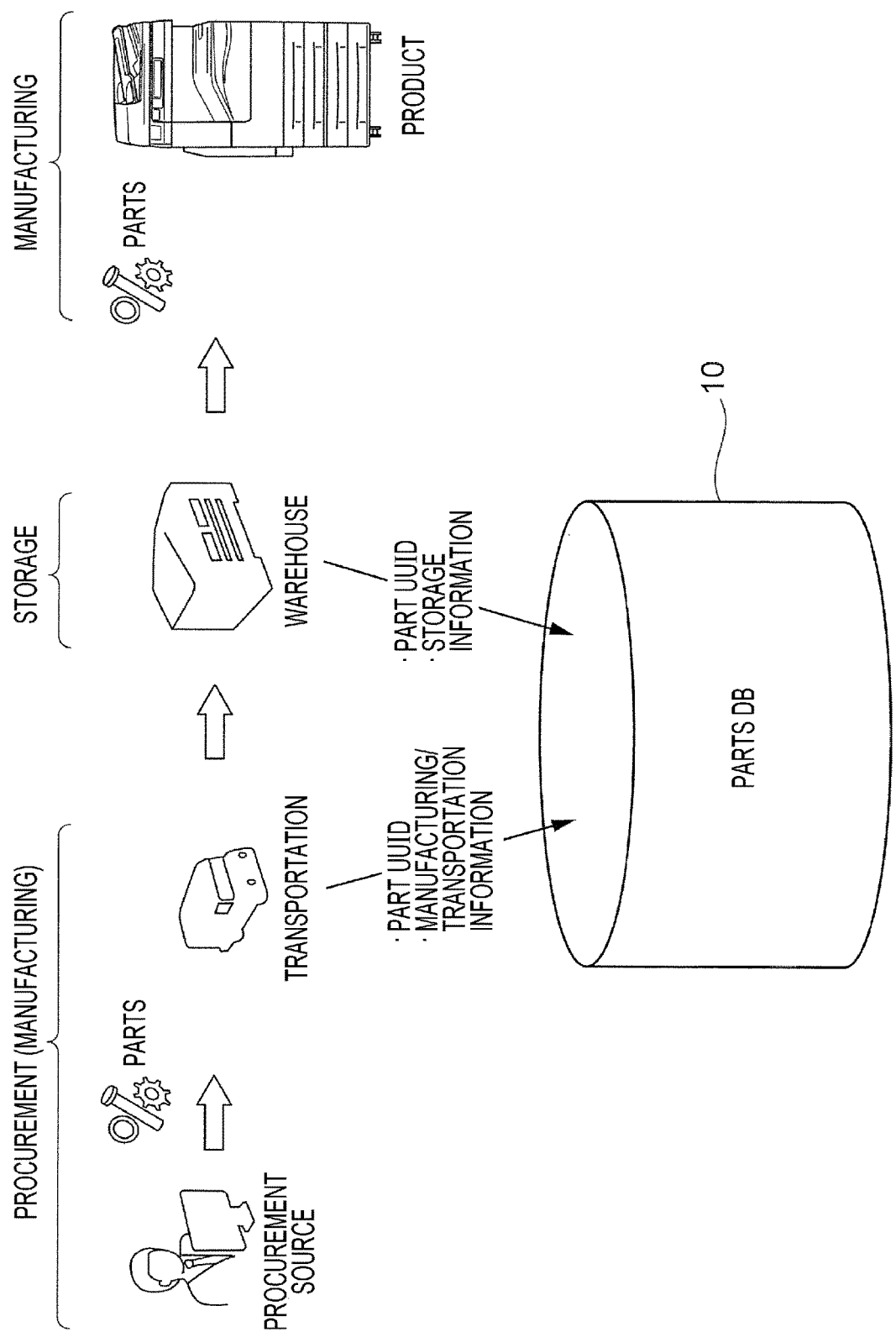

FIG. 3

| PART MODEL NUMBER | PART UUID | MANUFACTURING/ TRANSPORTATION INFORMATION | STORAGE INFORMATION | QUALITY LEVEL |
|---|---|---|---|---|
| P9803 | 9803-0663 | HIGHEST ACCELERATION: 20 m/s$^2$<br>HIGHEST TEMPERATURE: 30°C | HIGHEST TEMPERATURE: 40°C<br>HIGHEST ATMOSPHERIC PRESSURE: 1120 hPa | |
| P9803 | 9803-1102 | HIGHEST ACCELERATION: 20 m/s$^2$<br>HIGHEST TEMPERATURE: 31°C | HIGHEST TEMPERATURE: 39°C<br>HIGHEST ATMOSPHERIC PRESSURE: 1120 hPa | |
| P4533 | 4533-2311 | HIGHEST ACCELERATION: 10 m/s$^2$<br>HIGHEST TEMPERATURE: 23°C | HIGHEST TEMPERATURE: 39°C<br>HIGHEST ATMOSPHERIC PRESSURE: 920 hPa | |
| P9803 | 9803-0881 | HIGHEST ACCELERATION: 21 m/s$^2$<br>HIGHEST TEMPERATURE: 23°C | HIGHEST TEMPERATURE: 33°C<br>HIGHEST ATMOSPHERIC PRESSURE: 1060 hPa | |
| ... | ... | ... | ... | ... |

| PART MODEL NUMBER (11) | PART UUID (12) | MANUFACTURING/ TRANSPORTATION INFORMATION (13) | STORAGE INFORMATION (14) | USAGE INFORMATION (16) | QUALITY LEVEL (15) |
|---|---|---|---|---|---|
| P9803 | 9803-0663 | HIGHEST ACCELERATION: 20 m/s$^2$<br>HIGHEST TEMPERATURE: 30°C | HIGHEST TEMPERATURE: 40°C<br>HIGHEST ATMOSPHERIC PRESSURE: 1120 hPa | HIGHEST TEMPERATURE: 40°C | |
| P9803 | 9803-1102 | HIGHEST ACCELERATION: 20 m/s$^2$<br>HIGHEST TEMPERATURE: 31°C | HIGHEST TEMPERATURE: 39°C<br>HIGHEST ATMOSPHERIC PRESSURE: 1120 hPa | HIGHEST TEMPERATURE: 39°C | |
| P4533 | 4533-2311 | HIGHEST ACCELERATION: 10 m/s$^2$<br>HIGHEST TEMPERATURE: 23°C | HIGHEST TEMPERATURE: 39°C<br>HIGHEST ATMOSPHERIC PRESSURE: 920 hPa | HIGHEST TEMPERATURE: 39°C | |
| P9803 | 9803-0881 | HIGHEST ACCELERATION: 21 m/s$^2$<br>HIGHEST TEMPERATURE: 23°C | HIGHEST TEMPERATURE: 33°C<br>HIGHEST ATMOSPHERIC PRESSURE: 1060 hPa | HIGHEST TEMPERATURE: 33°C | |
| ... | ... | ... | ... | ... | ... |

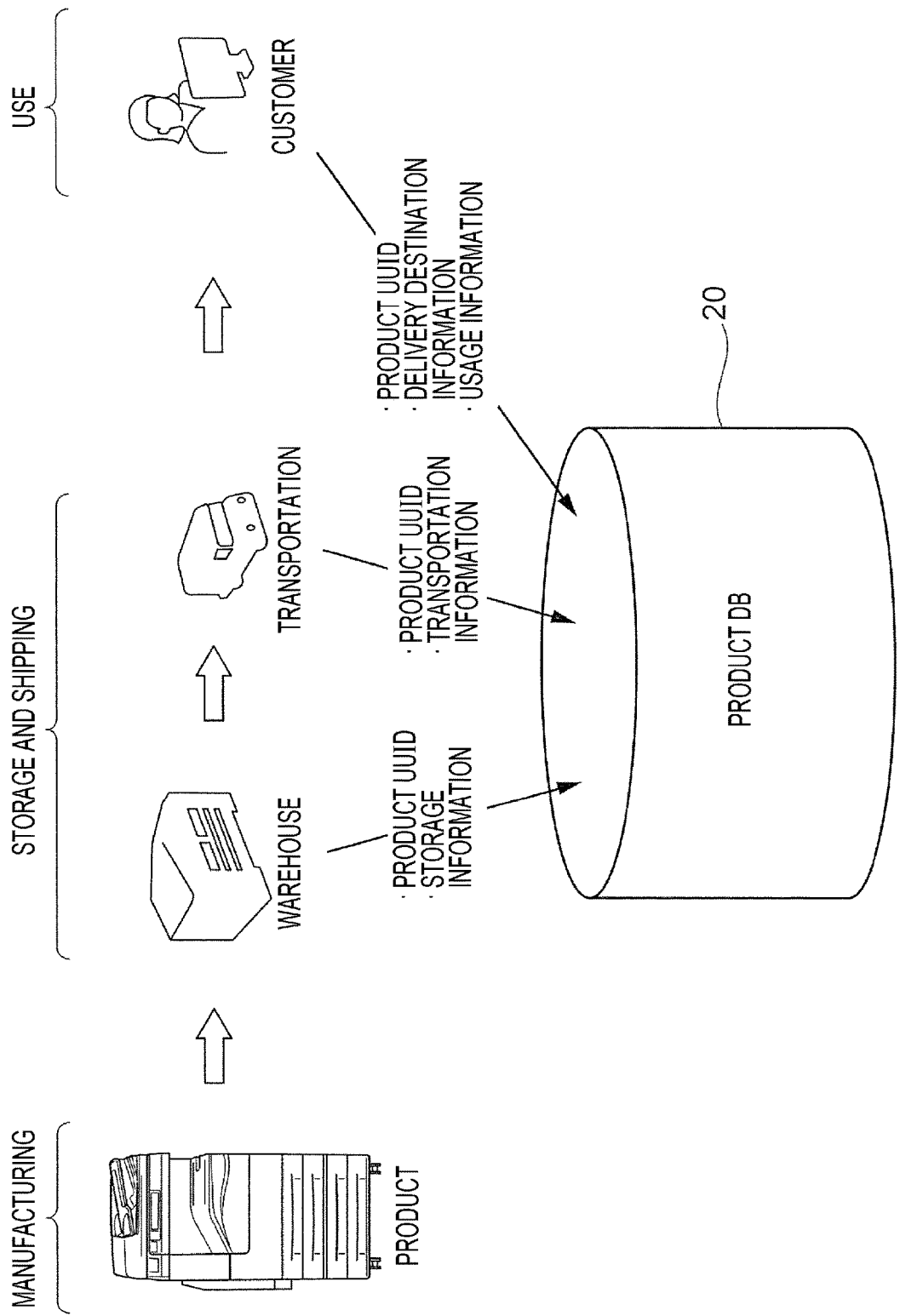

FIG. 6

| 21 | 22 | 23 | 24 | 25 | 26 |
|---|---|---|---|---|---|
| PRODUCT MODEL NUMBER | PRODUCT UUID | DELIVERY DESTINATION INFORMATION | STORAGE INFORMATION | TRANSPORTATION INFORMATION | USAGE INFORMATION |
| DEV101 | DEV101-23 | AAAAA | HIGHEST TEMPERATURE: 40°C HIGHEST ATMOSPHERIC PRESSURE: 1120 hPa | HIGHEST ACCELERATION: 20 m/s² HIGHEST TEMPERATURE: 30°C | HIGHEST TEMPERATURE: 40°C PRINTED: 250 PAGES PER DAY |
| DEV099 | DEV099-12 | BBBBB | HIGHEST TEMPERATURE: 39°C HIGHEST ATMOSPHERIC PRESSURE: 1120 hPa | HIGHEST ACCELERATION: 20 m/s² HIGHEST TEMPERATURE: 31°C | HIGHEST TEMPERATURE: 39°C PRINTED: 30 PAGES PER DAY |
| DEV101 | DEV101-08 | AAAAA | HIGHEST TEMPERATURE: 39°C HIGHEST ATMOSPHERIC PRESSURE: 920 hPa | HIGHEST ACCELERATION: 10 m/s² HIGHEST TEMPERATURE: 23°C | HIGHEST TEMPERATURE: 39°C PRINTED: 100 PAGES PER DAY |
| DEV007 | DEV007-82 | CCCCC | HIGHEST TEMPERATURE: 33°C HIGHEST ATMOSPHERIC PRESSURE: 1060 hPa | HIGHEST ACCELERATION: 10 m/s² HIGHEST TEMPERATURE: 23°C | HIGHEST TEMPERATURE: 33°C PRINTED: 20 PAGES PER DAY |
| ... | ... | ... | ... | ... | ... |

| 31 ERROR ID | 32 PRODUCT UUID | 33 ERROR TYPE | 34 DAMAGE SCALE | 35 CAUSE PHASE | 36 PART MODEL NUMBER | 37 PART UUID | 38 ERROR PORTION |
|---|---|---|---|---|---|---|---|
| E0001 | DEV101-23 | OCCURRENCE OF STREAKS | HEAVY | BEFORE MANUFACTURING | P9803 | P9803-1102 | S03-1 |
| E0002 | DEV099-12 | FAILURE TO PERFORM SCANNING | INTERMEDIATE | BEFORE MANUFACTURING | P4533 | P4533-1233 | S10-2 |
| E0003 | DEV101-08 | OCCURRENCE OF STREAKS | LIGHT | BEFORE MANUFACTURING | P9803 | P9803-0881 | S02-9 |
| E0004 | DEV007-82 | ABNORMALITIES OF FIXING UNIT | HEAVY | BEFORE MANUFACTURING | P6002 | P6002-0045 | S12-4 |
| ... | ... | ... | ... | ... | ... | ... | ... |

| PART MODEL NUMBER | PART UUID | QUALITY LEVEL |
|---|---|---|
| P9803 | 9803-1102 | 0 |
| P9803 | 9803-2311 | -1 |
| P9803 | 9803-0663 | -2 |
| P9803 | 9803-6221 | -3 |
| P9803 | 9803-0881 | -5 |

FIG. 17

PRODUCT INFORMATION

| PRODUCT MODEL NUMBER | PRODUCT UUID | DELIVERY DESTINATION INFORMATION | STORAGE INFORMATION | TRANSPORTATION INFORMATION | USAGE INFORMATION |
|---|---|---|---|---|---|
| DEV101 | DEV101-23 | AAAAA | HIGHEST TEMPERATURE: 40°C HIGHEST ATMOSPHERIC PRESSURE: 1120 hPa | HIGHEST ACCELERATION: 20 m/s² HIGHEST TEMPERATURE: 30°C | HIGHEST TEMPERATURE: 40°C PRINTED SHEETS: 250 PER DAY |
| DEV099 | DEV099-12 | BBBBB | HIGHEST TEMPERATURE: 39°C HIGHEST ATMOSPHERIC PRESSURE: 1120 hPa | HIGHEST ACCELERATION: 20 m/s² HIGHEST TEMPERATURE: 31°C | HIGHEST TEMPERATURE: 39°C PRINTED SHEETS: 30 PER DAY |
| DEV101 | DEV101-08 | AAAAA | HIGHEST TEMPERATURE: 39°C HIGHEST ATMOSPHERIC PRESSURE: 920 hPa | HIGHEST ACCELERATION: 10 m/s² HIGHEST TEMPERATURE: 23°C | HIGHEST TEMPERATURE: 39°C PRINTED SHEETS: 100 PER DAY |
| DEV007 | DEV007-82 | CCCCC | HIGHEST TEMPERATURE: 33°C HIGHEST ATMOSPHERIC PRESSURE: 1060 hPa | HIGHEST ACCELERATION: 10 m/s² HIGHEST TEMPERATURE: 23°C | HIGHEST TEMPERATURE: 33°C PRINTED SHEETS: 20 PER DAY |

ERROR INFORMATION

| ERROR ID | PRODUCT UUID | ERROR TYPE | DAMAGE SCALE | CAUSE PHASE | PART MODEL NUMBER | PART UUID | ERROR PORTION |
|---|---|---|---|---|---|---|---|
| E0001 | DEV101-23 | OCCURRENCE OF STREAKS | HEAVY | BEFORE MANUFACTURING | P9803 | P9803-1102 | S03-1 |
| E0002 | DEV099-12 | FAILURE TO PERFORM SCANNING | INTERMEDIATE | BEFORE MANUFACTURING | P4533 | P4533-1233 | S10-2 |
| E0003 | DEV101-08 | OCCURRENCE OF STREAKS | LIGHT | BEFORE MANUFACTURING | P9803 | P9803-0881 | S02-9 |
| E0004 | DEV007-82 | ABNORMALITIES OF FIXING UNIT | HEAVY | BEFORE MANUFACTURING | P6002 | P6002-0045 | S12-4 |

FIG. 18

| PORTION | PART MODEL NUMBER | QUALITY IMPORTANCE DEGREE |
|---------|-------------------|---------------------------|
| S22-8   | P9803             | 4                         |
| S03-1   | P9803             | 3                         |
| S01-4   | P9803             | 1                         |
| S71-9   | P9803             | 0                         |

FIG. 20

| PORTION<br>(QUALITY IMPORTANCE DEGREE) | PART UUID<br>(QUALITY LEVEL) |
|---|---|
| S22-8(4) | P9803-1102(0) |
| S03-1(3) | P9803-2311(-1) |
| S01-4(1) | P9803-0663(-2) |
| S71-9(0) | P9803-0881(-5) |

FIG. 21

| PART UUID (QUALITY LEVEL) |
|---|
| P9803-6221(-3) |

INFORMATION PROCESSING APPARATUS AND SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-176825 filed Sep. 14, 2017.

BACKGROUND

(i) Technical Field

The present invention relates to an information processing apparatus and system and a non-transitory computer readable medium.

(ii) Related Art

Today, many products are manufactured by combining plural parts. All individual parts used for manufacturing a product satisfy the quality specified by the corresponding model numbers of these parts. However, if the compatibility of a combination of parts is poor, the quality of the product may be decreased. For example, a combination of a memory of a certain model number and a circuit board of a certain model number does not influence the quality of a product. However, a combination of this memory and a circuit board of another model number may be more likely to make a product defective.

SUMMARY

According to an aspect of the invention, there is provided an information processing apparatus including first and second estimators and a determining unit. The first estimator estimates a quality of each individual part to be used for a product, based on error information concerning a manufactured product. The second estimator estimates a degree of an influence of each portion of a product on a quality of the product, based on the error information. The determining unit determines, for each portion of the product, which part will be used for a corresponding portion of the product, based on the estimated quality and the estimated degree of an influence.

BRIEF DESCRIPTION OF THE DRAWINGS

Exemplary embodiments of the present invention will be described in detail based on the following figures, wherein:

FIG. 2 illustrates an example of information collected and stored in a parts database (DB);

FIG. 3 illustrates a specific example of the parts DB;

FIG. 4 illustrates another specific example of the parts DB;

FIG. 5 illustrates an example of information collected and stored in a product DB;

FIG. 6 illustrates a specific example of the product DB;

FIG. 8 illustrates a specific example of the error DB;

FIG. 15 illustrates an example of calculation results of quality levels according to the exemplary embodiment;

FIG. 17 illustrates lists for explaining an example of processing executed by the product-quality influence estimator;

FIG. 18 illustrates an example of calculation results of quality importance degrees according to the exemplary embodiment;

FIG. 20 illustrates an example of a list output from the parts determining unit; and FIG. 21 illustrates an example of a list of unused parts.

DETAILED DESCRIPTION

Figure 1:
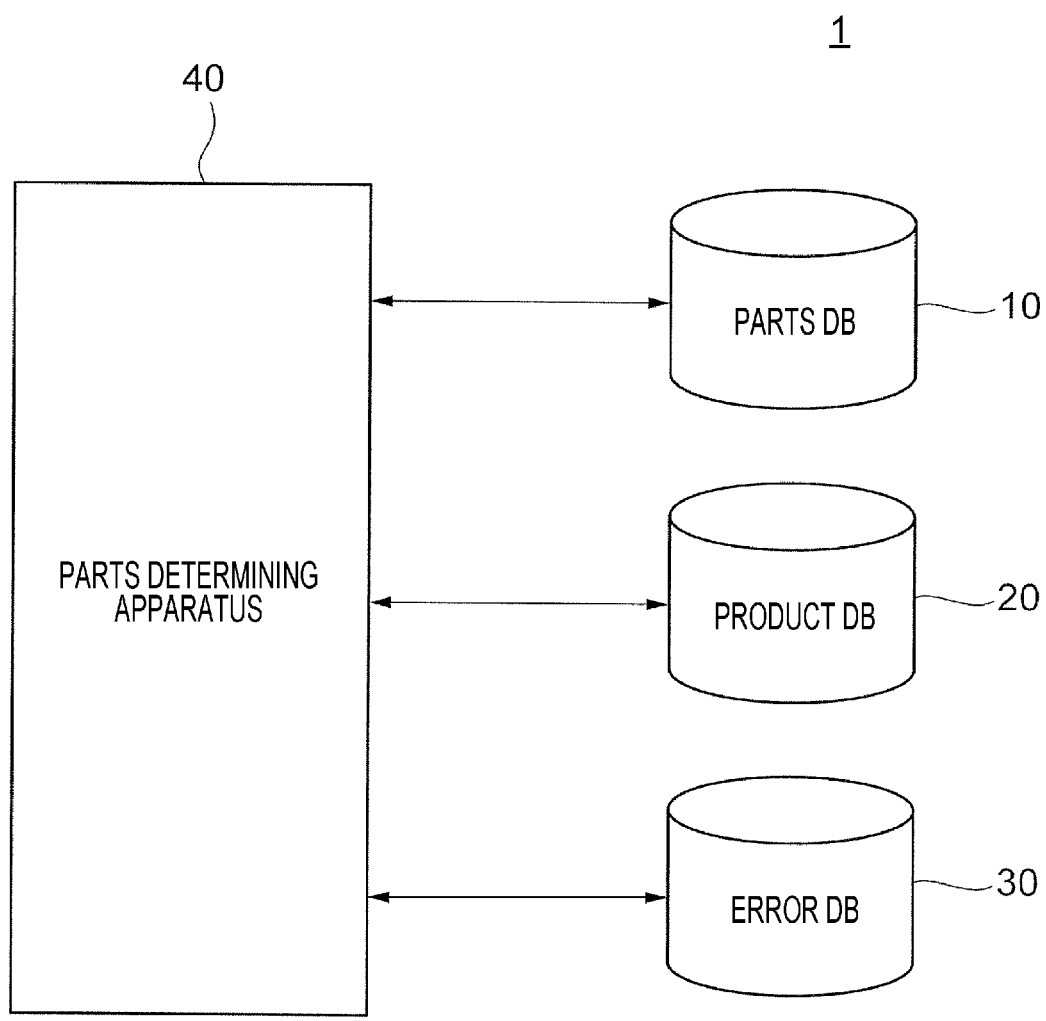
FIG. 1 illustrates an example of a manufacturing support system for an image forming device which serves as a product.

Exemplary embodiments of the invention will be described below in detail with reference to the accompanying drawings.

(Definition of Terms)

A product described in the exemplary embodiments is a tangible object constituted by a combination of plural tangible parts. A product that requires software processing to operate is also included in the products in the exemplary embodiments.

The products include electrical appliances, vehicles, ships, and airplanes which operate upon receiving supply of power.

Examples of the electrical appliances are image forming devices, video equipment, audio equipment, cameras, mobile information terminals, cellular phones, game machines, air conditioners, refrigerators, rice cookers, vacuum cleaners, cooking devices, computers, motors, and manufacturing machines. Structures constituted by a combination of plural parts (members), movable mechanisms, and batteries are also included in the products.

Regarding the products described in the exemplary embodiments, a function of collecting information concerning errors occurred in products after the start of their use and of storing such information is provided.

Information concerning errors occurred in products is collected during the maintenance process conducted by the maintenance staff or the repair process by the repair staff. Such information may be collected by utilizing the Internet of Things (IoT) technology without human intervention.

Regarding the products in the exemplary embodiments, it is desirable to collect information concerning the usage environments for the products. Such information may be collected by the maintenance staff or the repair staff or by utilizing the IoT technology without human intervention.

Collecting such information by utilizing the IoT technology may be performed directly by communication with object products, or by communication with various sensors disposed in the environments under which the products are used.

Parts described in the exemplary embodiments are individual tangible objects forming a product.

An individual product may be handled as a part in relation to another product. The products and the parts are relatively related to each other. For example, a certain part may be called a product or may be called a semi-product or a module. Hence, a module constituted by plural parts is an example of a product and is also an example of a part.

All the parts in the exemplary embodiment satisfy the manufacturing standards (predetermined tolerance and allowance).

In the exemplary embodiments, at least one of the parts forming a product satisfies one or both of the following conditions. One condition is that the quality of a part forming a product is changeable according to at least one of the reasons: the environments during the manufacturing process, the environments after the manufacturing process (including the environments during transportation or storage of the part), and the environments during the use of the part. The other condition is that, regarding parts of the same model number, they may influence the quality of a product differently depending for which portion of the product a part is used.

Exemplary Embodiment

[System Configuration]

A description will be given, assuming that a product is an image forming device.

The image forming device is a device for forming an image on a recording medium (hereinafter may also be called a sheet) and has a copy function, a scanner function, a fax sending/receiving function, and a print function.

However, the device that is assumed in the exemplary embodiment may not necessarily include all the above-described functions. A device dedicated to the use of one of the functions, such as a copying machine, a scanner (including a three-dimensional scanner), a fax sender-receiver, or a printer (including a three-dimensional printer), may be used, instead.

FIG. 1 illustrates an example of a manufacturing support system 1 for an image forming device which serves as a product.

The manufacturing support system 1 includes a parts database (DB) 10, a product DB 20, an error DB 30, and a parts determining apparatus 40. The parts DB 10 stores information concerning the environments for each of the parts forming the image forming device. The product DB 20 stores information concerning the environments for the image forming device (manufactured product). The error DB 30 stores information concerning errors occurred in the image forming device. By using the information stored in each of the parts DB 10, the product DB 20, and the error DB 30, the parts determining apparatus 40 determines, for each portion of the image forming device, which part will be used for a corresponding portion.

The manufacturing support system 1 is an example of the information processing system, and the parts determining apparatus 40 is an example of the information processing apparatus.

FIG. 2 illustrates an example of information collected and stored in the parts DB 10.

In the example in FIG. 2, information concerning the environments for individual parts is collected from a procurement process for the parts and a storage process for the parts before manufacturing the image forming device.

An individual part is a physically existing individual element, and is a smaller unit than a model number for identifying a model type of the part. In this exemplary embodiment, such a part is also called an individual part. The use of the concept of an individual part is to distinguish such a part from a part identified by a model number.

In the field in which plural parts forming a product are managed as one unit (lot unit), parts in the same lot are regarded as an individual part.

An individual part is managed, not by a model number indicating that this part belongs to a specific model type, but by a part universally unique identifier (UUID) for uniquely identifying the physical existence of this individual part. The part UUID is appended to an individual part by a parts manufacturing operator.

In the parts DB 10, not only information concerning parts stored in stock for future manufacturing, but also information concerning parts already used for past manufacturing is recorded.

Examples of the information concerning the environments for an individual part are information concerning the environments during the manufacturing of a part, information concerning the environments during the transportation of a part, information concerning the environments during the storage of a part, and information concerning the environments during the use of a part.

An example of information concerning the environments during the manufacturing of a part is information concerning a manufacturer.

Examples of information concerning the environments during the transportation of a part are information concerning a transportation route, information concerning the vibration (acceleration) detected during the transportation, information concerning a vehicle used for the transportation, and information concerning the temperature, atmospheric pressure, humidity, luminous intensity, and magnetic force during the transportation.

Examples of information concerning the environments during the storage of a part are information concerning the storage location and date, information concerning the vibration (acceleration) detected during the storage, and information concerning the temperature, atmospheric pressure, humidity, luminous intensity, and magnetic force during the storage.

Examples of information concerning the environments during the use of a part are information concerning the usage location, information concerning the usage frequency, information concerning the vibration (acceleration) detected during the use, and information concerning the temperature, atmospheric pressure, humidity, luminous intensity, and magnetic force during the use.

Information concerning the environments for an individual part may be one of or both of information concerning the environments during the manufacturing of this part and information concerning the environments after the manufacturing of this part.

Information concerning a transportation route may be input manually or be obtained from an automotive navigation system.

Information concerning a vehicle used for the transportation may be input manually or be obtained by utilizing the IoT technology.

Information concerning the vibration (acceleration) and information concerning the temperature, atmospheric pressure, humidity, luminous intensity, and magnetic force may be read from recorded values obtained by sensors or may be obtained by utilizing the IoT technology.

Information to be recorded may be different according to the individual part.

FIG. 3 illustrates a specific example of the parts DB 10.

In the parts DB 10 shown in FIG. 3, regarding each of the parts forming the image forming device, a part model number 11, a part UUID 12, manufacturing/transportation information 13, storage information 14, and a quality level 15 are recorded.

For example, the parts DB 10 shows that the part identified by the part model number 11 as P9803 and by the part UUID 12 as 9803-0663 has been subjected to the highest acceleration of 20 m/s$^2$ and the highest temperature of 30° C. during the period from the manufacturing process to the transportation process and also subjected to the highest temperature of 40° C. and the highest atmospheric pressure of 1120 hPa during the storage process in a warehouse.

The manufacturing/transportation information 13 and the storage information 14 are examples of information concerning the environments linked with an individual part identified by the part UUID 12.

In the example shown in FIG. 3, the highest values of the acceleration, temperature, and atmospheric pressure are recorded. However, the lowest values may be recorded, or both of the highest values and the lowest values may be recorded. A temporal change in measured values or a predetermined time range for which a certain value has been measured may be recorded.

In the quality level 15, a value representing the level of quality which is quantitatively estimated by the parts determining apparatus 40 is recorded.

In this exemplary embodiment, the default value of the quality level is 0, and as the estimated level of quality is lower, the absolute value becomes greater in the negative direction.

In the field of the quality level 15, a value representing the level of the future quality estimated at least for an individual part used for future manufacturing is recorded. As the quality level of an individual part approaches 0, a higher level of quality may be expected if this part is used for manufacturing a product.

The quality level 15 is an example of an index representing the quality of an individual part. A specific example of the calculation for the quality level 15 will be discussed later.

FIG. 4 illustrates another specific example of the parts DB 10. The same fields as those in FIG. 3 are indicated by like reference numerals.

In the parts DB 10 in FIG. 4, usage information 16, which is an example of information concerning the environments after the manufacturing process is added.

For example, the parts DB 10 in FIG. 4 shows that, concerning the part identified by the part model number 11 as P9803 and by the part UUID 12 as 9803-0663, an image forming device as a product including this part has been used under the highest temperature of 40° C.

FIG. 5 illustrates an example of information collected and stored in the product DB 20.

In the example in FIG. 5, information concerning the environments for an individual product is collected from a storage process for a manufactured product in a warehouse, a transportation process for transporting a product from the warehouse to a customer, and a process after the start of the use of a product.

An individual product is managed, not by a model number indicating that this product belongs to a specific model type, but by a product UUID for uniquely identifying the physical existence of this individual product.

Examples of information concerning the environments for an individual product are information concerning the environments during the storage of a product, information concerning the environments during the transportation of a product, information concerning a delivery destination, and information concerning the environments during the use of a product.

Examples of information concerning the environments during the storage of a product are information concerning the storage location and arrival date, information concerning the vibration (acceleration) detected during the storage, and information concerning the temperature, atmospheric pressure, humidity, luminous intensity, and magnetic force during the storage.

Examples of information concerning the environments during the transportation of a product are information concerning a manufacturer, information concerning a transportation route, information concerning the vibration (acceleration) detected during the transportation, information concerning a vehicle used for the transportation, information concerning the weather during the transportation, information concerning the time slot of the day used for the transportation, and information concerning the temperature, atmospheric pressure, humidity, luminous intensity, and magnetic force during the transportation.

An example of information concerning a delivery destination is information concerning the name and the address of a delivery destination.

Examples of information concerning the environments during the use of a product are information concerning the vibration (acceleration) detected during the use, and information concerning the temperature, atmospheric pressure, humidity, luminous intensity, magnetic force, and usage frequency during the use.

Information to be recorded may be different according to the individual product.

FIG. 6 illustrates a specific example of the product DB 20.

In the product DB 20 shown in FIG. 6, regarding an individual product as an image forming device, a product model number 21, a product UUID 22, delivery destination information 23, storage information 24, transportation information 25, and usage information 26 are recorded.

For example, regarding the product identified by the product model number 21 as DEV101 and by the product UUID 22 as DEV101-23, the following items of information are recorded. The address of the delivery destination is "AAAAA". The product has been subjected to the highest temperature of 40° C. and the highest atmospheric pressure of 1120 hPa during the storage in a warehouse. The product has been subjected to the highest acceleration of 20 m/s$^2$ and the highest temperature of 30° C. during the transportation from the warehouse. The product has been subjected to the highest temperature of 40° C. during the use and has printed 250 pages per day.

The delivery destination information 23, the storage information 24, the transportation information 25, and the usage information 26 are examples of information concerning the environments linked with an individual product identified by the product UUID 22.

In the example shown in FIG. 6, the highest values of the acceleration, temperature, and atmospheric pressure are recorded. However, the lowest values may be recorded, or both of the highest values and the lowest values may be recorded. A temporal change in measured values or a predetermined time range for which a certain value has been measured may be recorded.

Figure 7:
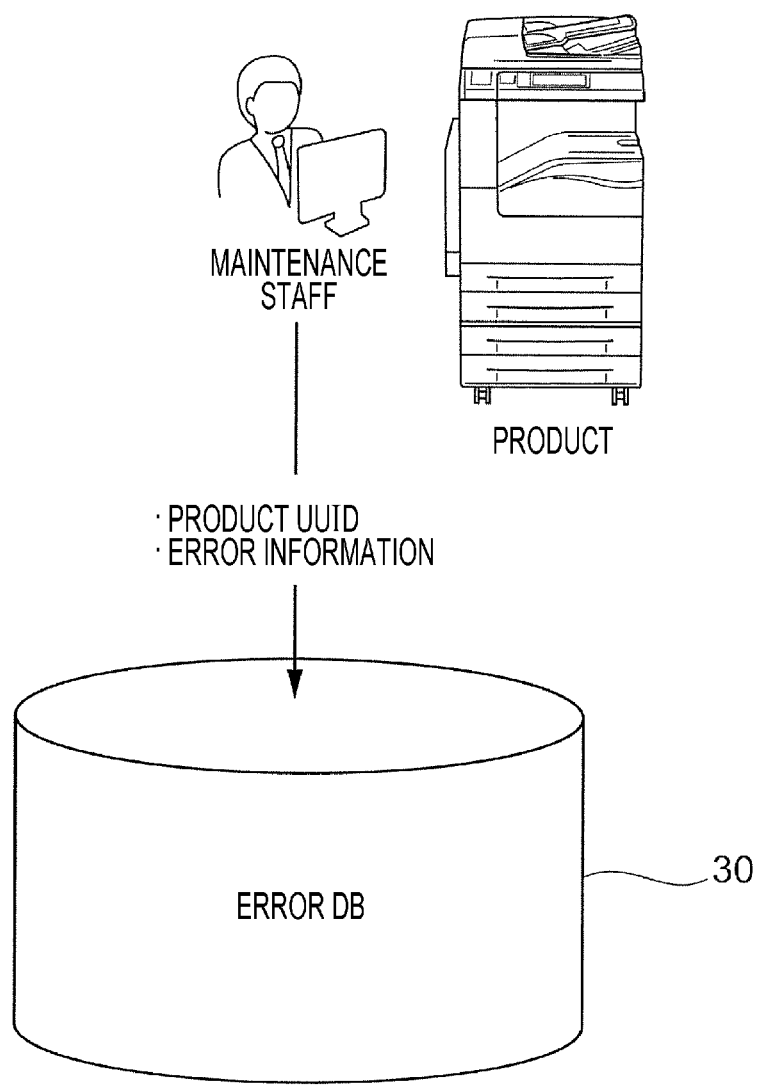
FIG. 7 illustrates an example of information collected and stored in an error DB.

FIG. 7 illustrates an example of information collected and stored in the error DB 30.

In the error DB 30 in FIG. 7, information concerning errors occurred during the use of a product by customers is collected and stored.

Information concerning errors varies according to the type of product. In the case of an image forming device, error information indicate errors regarding printing, such as the nonuniformity, stains, lines (color lines), afterimage, and white streaks, and errors regarding the failure to perform optical reading of documents, for example, failure to perform scanning. In the case of an electrophotographic image forming device, error information also indicates the abnormalities of a fixing unit for fixing toner on sheets.

Error information is managed by the product UUID.

FIG. 8 illustrates a specific example of the error DB 30.

In the error DB 30 shown in FIG. 8, an error ID 31, a product UUID 32, an error type 33, damage scale 34, a cause phase 35, a part model number 36, a part UUID 37, and an error portion 38 are recorded. The error ID 31 indicates an identifier for identifying an error. The cause phase 35 indicates at which stage the cause of an error has been generated. The part model number 36 indicates the model number of a part that has caused an error. The part UUID 37 indicates a part caused an error. The error portion 38 indicates in which portion of the product an error has occurred.

For example, the error DB 30 shows that, regarding the error ID E0001, the product UUID 32 of the image forming device in which an error has occurred is DEV101-23, the error type 33 is the occurrence of streaks in a printed medium, the damage scale 34 is heavy, the cause phase 35 is a stage before manufacturing, the part model number 36 is P9803, the part UUID 37 is P9803-1102, and the error portion 38 is S03-1.

Regarding the error type 33, options for the types of errors are provided according to the product, and a registered user selects a type among the options and inputs the selected type into the error DB 30. The registered user may add a new type of error to the options.

In this exemplary embodiment, the damage scale 34 is represented by three levels "heavy", "intermediate", and "light". The damage scale 34 may alternatively be represented by two levels or four or more levels. As the damage scale 34, the loss (amount of money) may be recorded. The estimated damage scale may be input by the maintenance staff of the error DB 30, for example, according to the predetermined standards.

In this exemplary embodiment, the cause phase 35 is represented by two stages "before manufacturing" and "after manufacturing". If it is possible to divide the cause phase in greater details, the cause phase 35 may be represented by three or more stages.

A symbol, such as alphanumeric characters, representing the error portions 38 is provided according to the individual portion.

Figure 9:
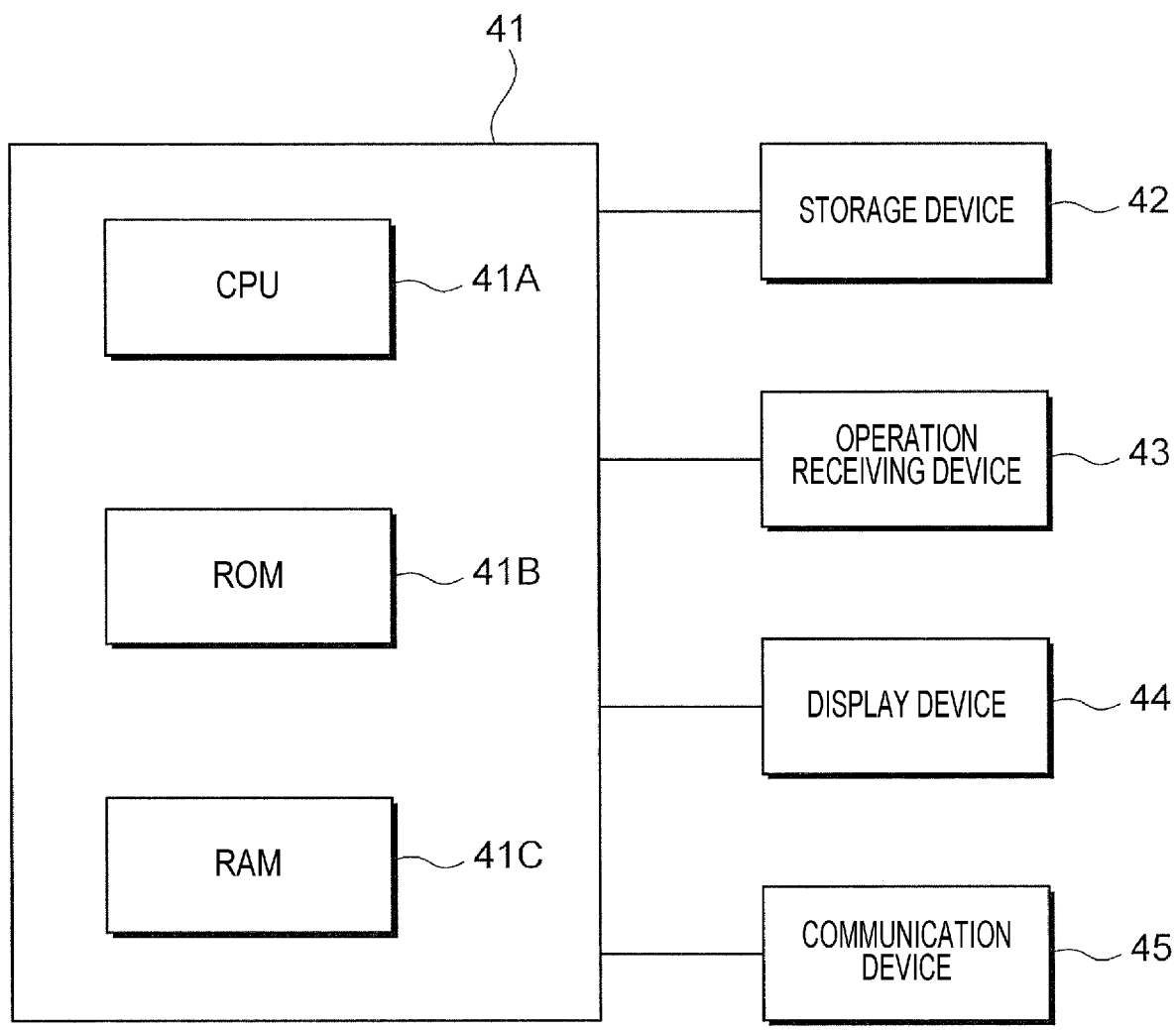
FIG. 9 illustrates an example of the hardware configuration of a parts determining apparatus according to an exemplary embodiment.

FIG. 9 illustrates an example of the hardware configuration of the parts determining apparatus 40 according to this exemplary embodiment.

In this exemplary embodiment, the part type used for manufacturing the image forming device is determined. In other words, the part model number (P9803, for example) used for the individual portions of the image forming device is specified by a design drawing.

The parts determining apparatus 40 according to this exemplary embodiment has a function of determining, for each portion of the image forming device, which part will be used for a corresponding portion (that is, by using the part UUIDs).

The parts determining apparatus 40 includes a data processing device 41, a storage device 42, an operation receiving device 43, a display device 44, and a communication device 45. The data processing device 41 processes data. The storage device 42 is constituted by a hard disk drive, for example, storing an application program. The operation receiving device 43 receives operations from a user. The display device 44 is used for inputting and presenting information. The communication device 45 communicates with the parts DB 10, the product DB 20, and the error DB 30, for example.

In this exemplary embodiment, the parts determining apparatus 40 is implemented by a computer.

Although in FIG. 9 the parts determining apparatus 40 is implemented by a single computer, it may be implemented by multiple computers. The parts determining apparatus 40 may be implemented by three computers according to the processing function, which will be discussed later.

The data processing device 41 includes a central processing unit (CPU) 41A, a read only memory (ROM) 41B for storing an operation system and firmware executed by the CPU 41A, and a random access memory (RAM) 41C used for a work area by the CPU 41A.

The storage device 42 stores an application program which implements processing functions, which will be discussed later.

The operation receiving device 43 is an input device, such as a mouse and a keyboard, and receives input of information via the use of a user interface screen displayed on the display screen of the display device 44.

The display device 44 is a liquid crystal display, for example, and is used for displaying the user interface screen.

The communication device 45 is a local area network (LAN) interface, for example, and is used for communication with external devices. The communication device 45 may perform communication via either one of a wired medium and a wireless medium.

Figure 10:
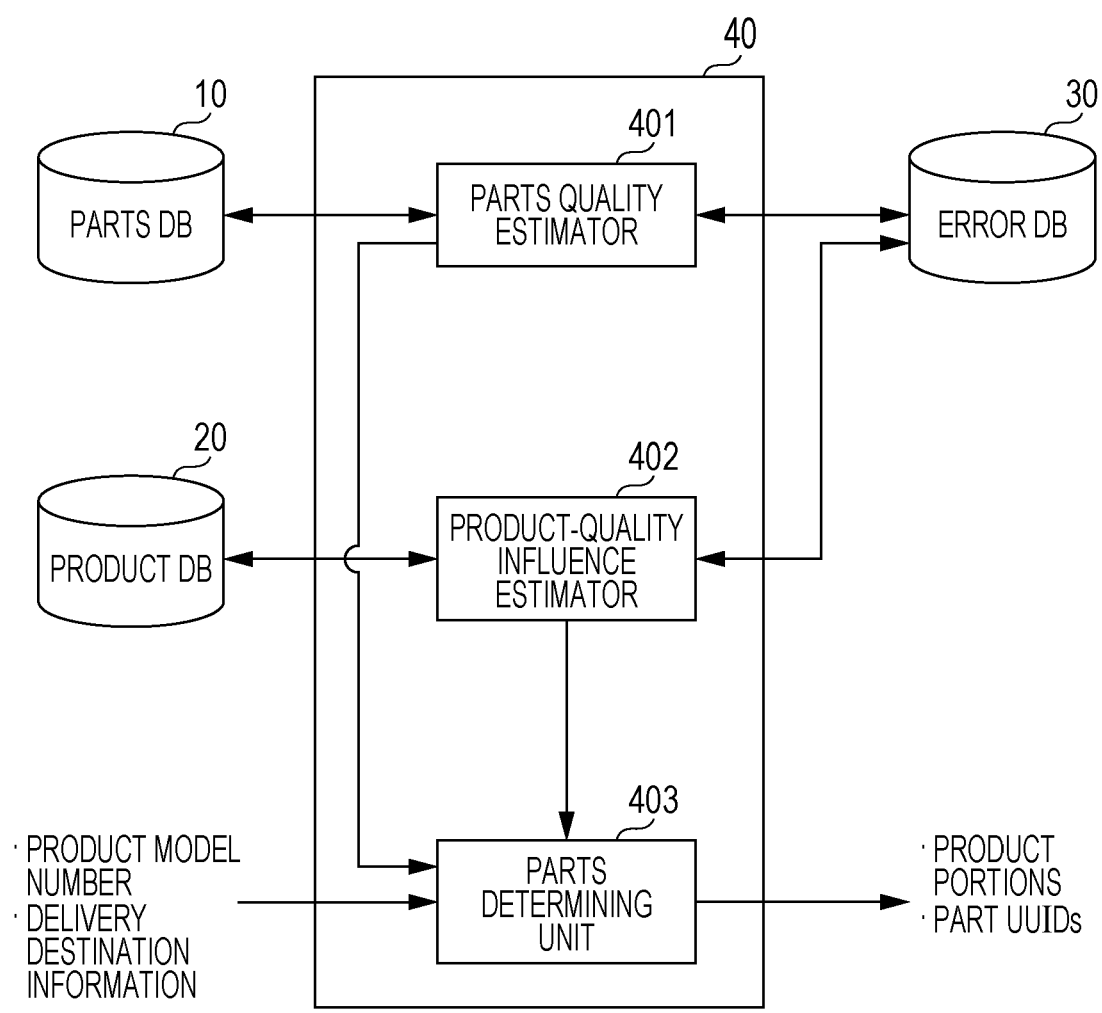
FIG. 10 illustrates an example of the functional configuration of the parts determining apparatus according to the exemplary embodiment.

FIG. 10 illustrates an example of the functional configuration of the parts determining apparatus 40 according to this exemplary embodiment.

The parts determining apparatus 40 includes a parts quality estimator 401, a product-quality influence estimator 402, and a parts determining unit 403. On the basis of collected error information concerning the image forming device, the parts quality estimator 401 estimates, for each part, the quality levels of the individual parts to be used for a product as the image forming device. On the basis of collected error information concerning the image forming device, the product-quality influence estimator 402 estimates the degree of influence of each portion of a product on the product quality in the case of the occurrence of an error.

On the basis of the estimated quality of each part and the degree of influence of each portion on the product quality, the parts determining unit 403 determines, for each portion of the product, which part will used for a corresponding portion.

The functions of the parts quality estimator 401, the product-quality influence estimator 402, and the parts determining unit 403 are provided as a result of executing the application program.

In this exemplary embodiment, the parts quality estimator 401, the product-quality influence estimator 402, and the parts determining unit 403 may also be collectively called a manufacturing support function or a manufacturing support program.

The parts quality estimator 401 is an example of a first estimator. The product-quality influence estimator 402 is an example of a second estimator. The parts determining unit 403 is an example of a determining unit.

The parts quality estimator 401 in this exemplary embodiment estimates the level of the future quality of an individual part, based on data in the parts DB 10 and the error DB 30, and outputs the estimated quality levels to the parts determining unit 403.

The parts quality estimator 401 calculates the level of the future quality, based on the assumption that a part subjected to the environments similar to those of a part caused an error in the past is likely to cause an error. A specific example of the calculation made by the parts quality estimator 401 will be discussed later. In this exemplary embodiment, "environments are similar to each other" means that the distance between data concerning a certain environment and data concerning another environment is shorter than a threshold.

The product-quality influence estimator 402 in this exemplary embodiment estimates, as a quality importance degree, the degree of influence of an individual portion of a product on the product quality in the case of the occurrence of an error, and outputs the estimated quality importance degree to the parts determining unit 403. The product-quality influence estimator 402 utilizes data in the product DB 20 and the error DB 30 for calculating the quality importance degree.

The product-quality influence estimator 402 calculates the quality importance degree, based on the assumption that a portion of a product which is more likely to cause an error and to incur a higher level of damage by an error will produce a higher degree of influence on the product quality.

The quality importance degree is an example of an index representing the degree of influence on the quality of a product.

A specific example of the calculation made by the product-quality influence estimator 402 will be discussed later. A portion of the product which frequently appears in error records, although the levels of damage incurred by errors are not high, will be handled as a portion which will produce a high degree of influence on the product quality.

In response to specifying of a product model number and delivery destination information on the user interface screen, the parts determining unit 403 refers to the quality level estimated for each individual part to be used for manufacturing the ordered image forming device and the quality importance degree calculated for each portion of the image forming device, and determines, for each portion of the image forming device, which part will be used for a corresponding portion. The parts determining unit 403 then outputs information concerning determined combinations of parts and part UUIDs.

The parts determining unit 403 may display a list of the combinations of parts and part UUIDs on the user interface screen of the display device 44, for example. The parts determining unit 403 may print this list on a sheet by using a printer (not shown), for example.

(Processing Operations)

An example of processing executed by each of the parts quality estimator 401, the product-quality influence estimator 402, and the parts determining unit 403 of the parts determining apparatus 40 will be described below.

Figure 11:
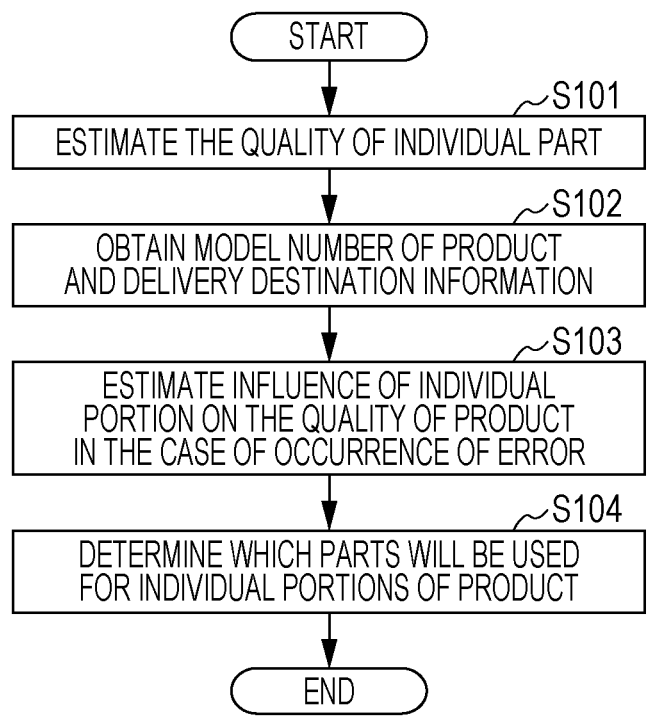
FIG. 11 is a flowchart illustrating an overview of processing executed by the parts determining apparatus according to the exemplary embodiment.

FIG. 11 is a flowchart illustrating an overview of the processing executed by the parts determining apparatus 40 according to this exemplary embodiment.

The processing is implemented as a result of the CPU 41A executing the application program.

In step S101, the CPU 41A estimates the quality of each individual part. That is, the CPU 41A estimates, not the quality of a part identified by a model number which specifies a model type, but the quality of a part which is physically uniquely identified as an individual element. A specific example of the processing content will be discussed later.

Then, in step S102, the CPU 41A obtains the model number of a product to be manufactured and delivery destination information via the use of the operation receiving device 43 (see FIG. 9).

Then, in step S103, the CPU 41A estimates the influence of each individual portion of the product on the product quality in the case of the occurrence of an error. A specific example of the processing content will be discussed later.

Then, in step S104, the CPU 41A determines, for each portion of the product, which part will be used for a corresponding portion. A specific example of the processing content will be discussed later.

Figure 12:
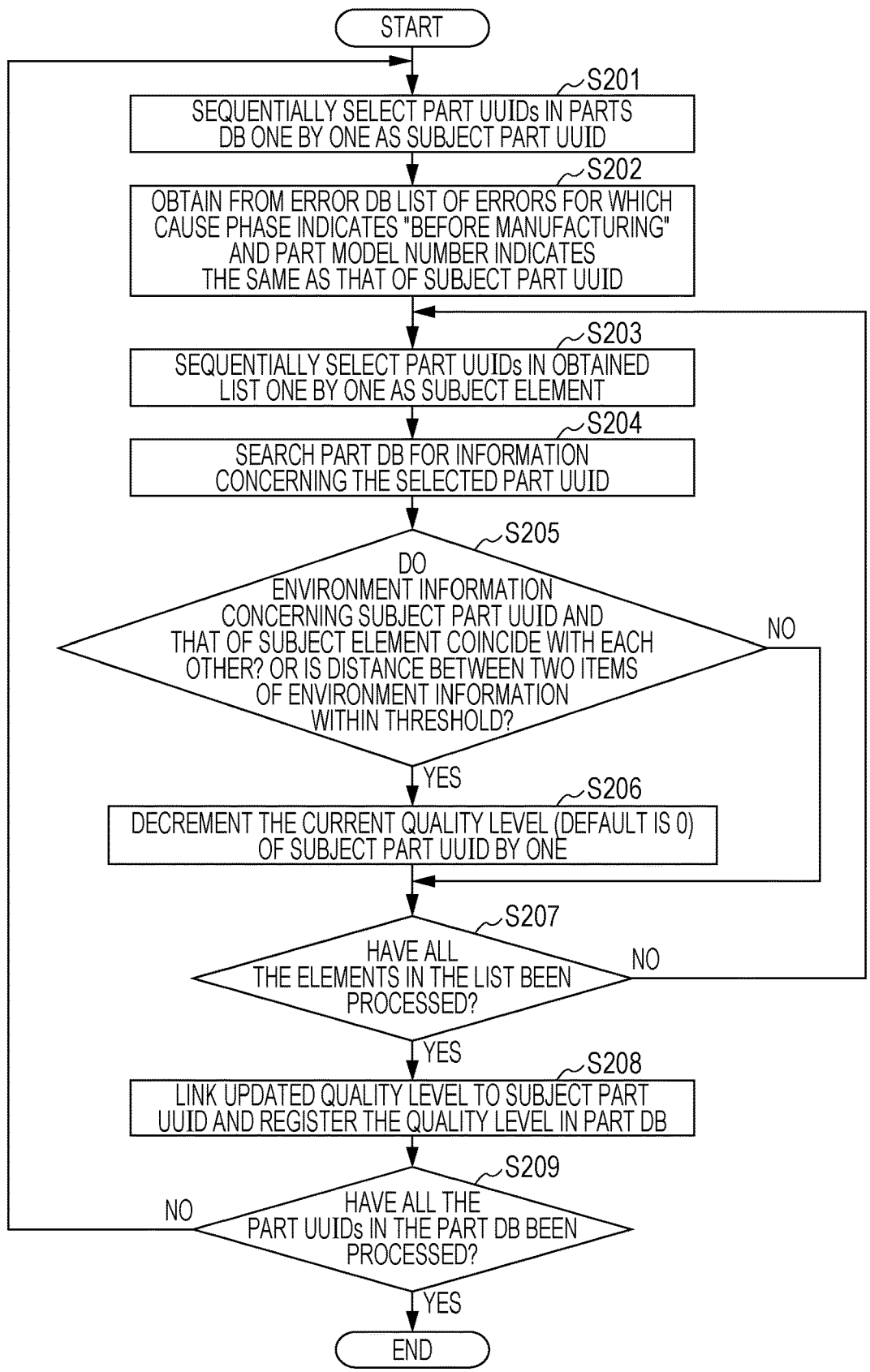
FIG. 12 is a flowchart illustrating an example of processing executed by a parts quality estimator according to the exemplary embodiment.

FIG. 12 is a flowchart illustrating an example of processing executed by the parts quality estimator 401 according to this exemplary embodiment.

The parts quality estimator 401 (see FIG. 10) is implemented as a result of the CPU 41A (see FIG. 9) executing the application program. The processing shown in FIG. 12 is executed when the parts DB 10 (see FIG. 1) is updated or when the error DB 30 (see FIG. 1) is updated, for example.

In step S201, the parts quality estimator 401 sequentially selects part UUIDs in the parts DB 10 (see FIG. 10) one by one as a subject part UUID. In this case, the parts quality estimator 401 excludes part UUIDs for which the quality levels have already been calculated.

Then, in step S202, the parts quality estimator 401 obtains from the error DB 30 (see FIG. 10) a list of errors for which the cause phase 35 indicates "before manufacturing" and the part model number 36 indicates the same part number as that of the subject part UUID. If applicable errors are not found, the parts quality estimator 401 obtains a blank list.

In step S203, the parts quality estimator 401 then sequentially selects part UUIDs in the obtained list one by one as a subject element.

Then in step S204, by using the selected part UUID, the parts quality estimator 401 searches the parts DB 10 for information concerning the selected part UUID. The purpose of this search is to obtain information concerning the past environments for a part which has caused an error indicated in the list.

The parts quality estimator 401 then judges in step S205 whether the information concerning the environments of the subject part UUID coincides with that of the subject element or whether the distance between the two items of environment information is within a threshold. In this case, "the distance between the two items of environment information is within a threshold" means that the two items of environment information are similar to each other.

If the result of step S205 is NO, the parts quality estimator 401 proceeds to step S207.

If the result of step S205 is YES, the parts quality estimator 401 proceeds to step S206. In step S206, the parts quality estimator 401 decrements the current quality level of the subject part UUID by one. In this exemplary embodiment, as the environment information concerning the subject part UUID is similar to that of more elements that have caused errors, the quality level of the subject part UUID is reduced to a smaller value.

The parts quality estimator 401 then judges in step S207 whether all the elements in the list have been processed.

If the result of step S207 is NO, the parts quality estimator 401 returns to step S203 to select the subsequent element (part UUID) in the list and executes the above-described operations.

If the result of step S207 is YES, the parts quality estimator 401 proceeds to step S208. In step S208, the parts quality estimator 401 links the updated quality level with the subject part UUID and registers the quality level in the parts DB 10.

The quality level may be registered in the parts DB 10 immediately after it is updated in step S206.

The parts quality estimator 401 then judges in step S209 whether all the part UUIDs in the parts DB 10 have been processed.

If the result of step S209 is NO, the parts quality estimator 401 returns to step S201 to select the subsequent part UUID in the parts DB 10 and executes the above-described operations.

If the result of step S209 is YES, the parts quality estimator 401 completes the calculation processing for the quality levels.

Figure 13:
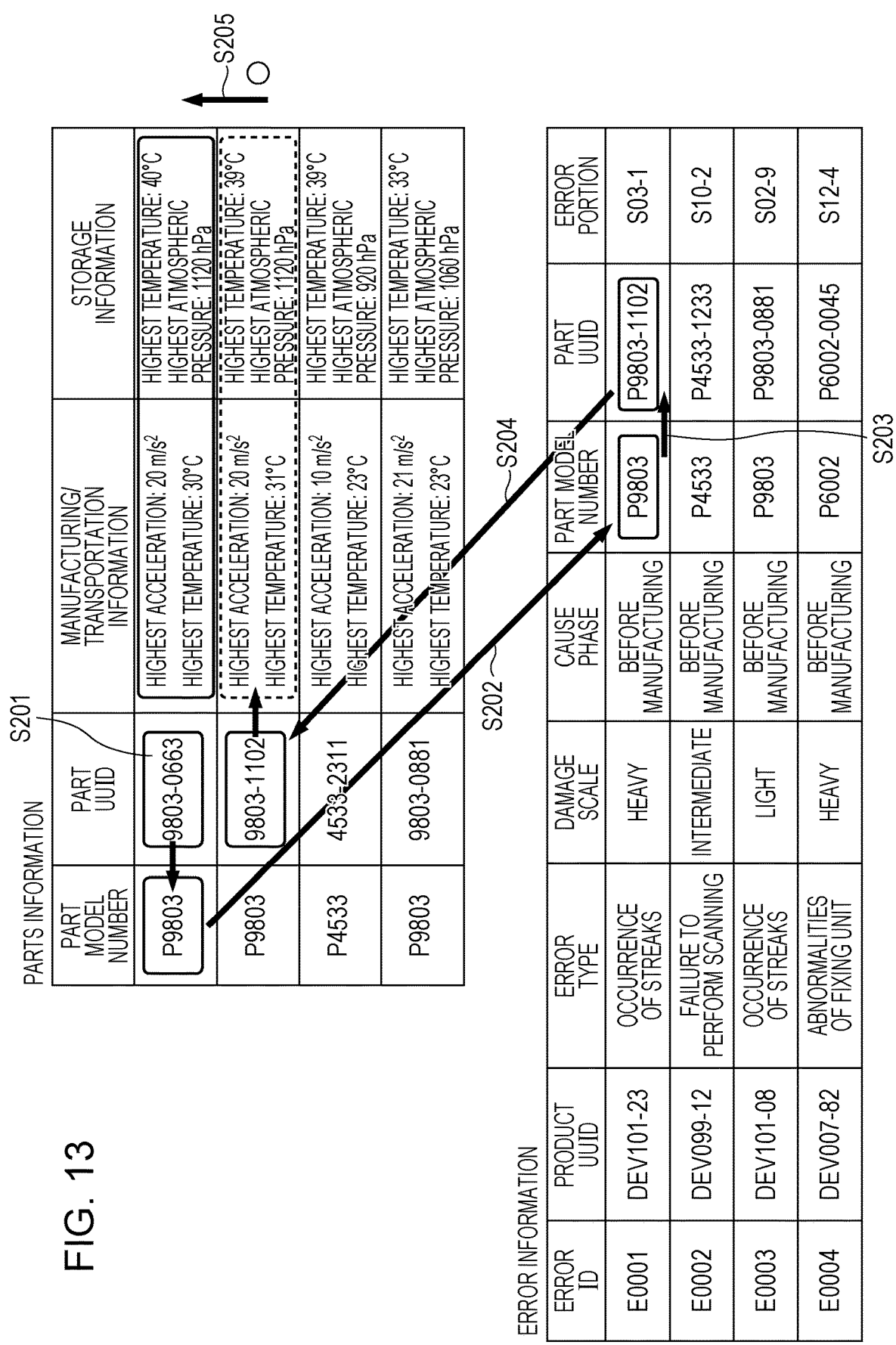
FIG. 13 illustrates lists for explaining an example of processing executed by the parts quality estimator.

FIG. 13 illustrates lists for explaining an example of processing executed by the parts quality estimator 401.

In the example in FIG. 13, environment information concerning a subject part UUID is similar to that of the part UUID of a subject element in the error DB 30.

S201 through S205 indicated in FIG. 13 correspond to the operations in the corresponding step numbers in FIG. 12.

In the example in FIG. 13, the subject part UUID is 9803-0663, and the part model number is P9803.

Concerning the parts identified by the part model number P9803, two error records are found in the error DB 30, and one of the errors in the records has occurred in the part identified by the part UUID "9803-1102". The list in the upper section of FIG. 13 shows that the part identified by the part UUID "9803-1102" has been subjected to the highest acceleration of 20 m/s$^2$ and the highest temperature of 31° C. during the period from the manufacturing process to the transportation process and also subjected to the highest temperature of 39° C. and the highest atmospheric pressure of 1120 hPa during the storage process.

In the example in FIG. 13, the differences in the environments between the subject part UUID 9803-0663 and the part UUID 9803-1102 in one of the error records are the highest temperature during the period from the manufacturing process to the transportation process and also the highest temperature during the storage process. The differences are both 1° C.

In the example in FIG. 13, the parts quality estimator 401 judges that the distance in the environment information between the two parts is within the threshold. The judgement content is indicated by the circle in FIG. 13.

Figure 14:
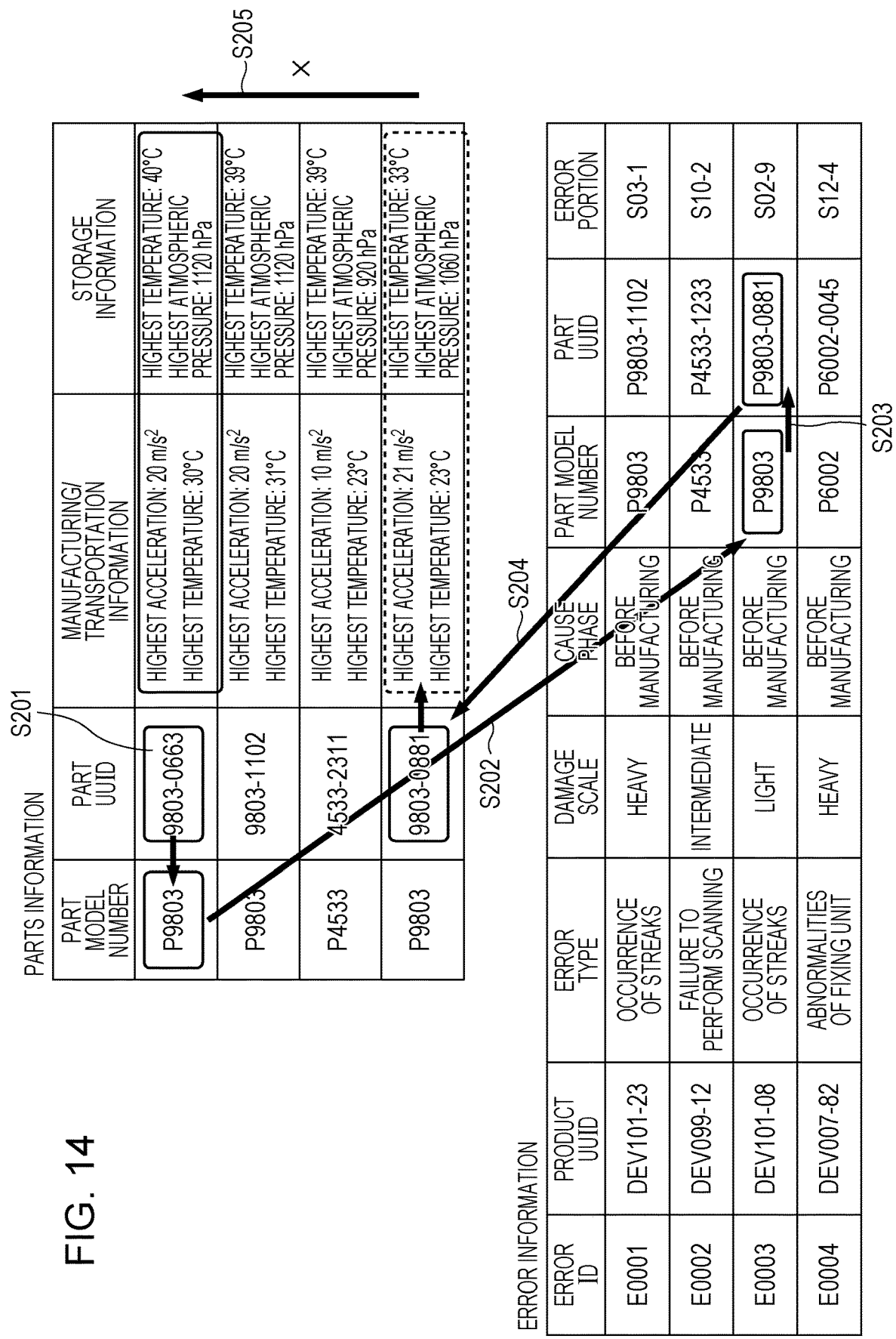
FIG. 14 illustrates lists for explaining another example of processing executed by the parts quality estimator.

FIG. 14 illustrates lists for explaining another example of processing executed by the parts quality estimator 401.

In the example in FIG. 14, environment information concerning a subject part UUID is not similar to that of the part UUID of another subject element in the error DB 30.

S201 through S205 indicated in FIG. 14 correspond to the operations in the corresponding step numbers in FIG. 12.

In the example in FIG. 14, as well as that in FIG. 13, the subject part UUID is 9803-0663, and the part model number is P9803.

Concerning the parts identified by the part model number P9803, two error records are found in the error DB 30, and one of the errors in the records has occurred in the part identified by the part UUID "9803-0881". The list in the upper section of FIG. 14 shows that the part identified by the part UUID "9803-0881" has been subjected to the highest acceleration of 21 m/s$^2$ and the highest temperature of 23° C. during the period from the manufacturing process to the transportation process and also subjected to the highest temperature of 33° C. and the highest atmospheric pressure of 1060 hPa during the storage process.

In the example in FIG. 14, the differences in the environments between the subject part UUID 9803-0663 and the part UUID 9803-0881 in one of the error records are the highest acceleration and the highest temperature during the period from the manufacturing process to the transportation process and the highest temperature and the highest atmospheric pressure during the storage process.

In the example in FIG. 14, the parts quality estimator 401 judges that the distance in the environment information between the two parts exceeds the threshold. The judgement content is indicated by the cross (X) in FIG. 14.

FIG. 15 illustrates an example of the calculation results of the quality levels according to this exemplary embodiment.

The list in FIG. 15 shows examples of the numeric values concerning certain parts of one part model number forming the image forming device. More specifically, FIG. 15 shows the quality levels concerning parts of the part model number P9803. The list in FIG. 15 is rearranged (sorted) in descending order of the quality level.

In the list in FIG. 15, the part UUID 9803-1102 is estimated to have the highest quality, while the part UUID 9803-0881 is estimated to have the lowest quality.

As a result of calculating the quality levels according to the processing in FIG. 12, five records (cases) of errors occurred under the environments similar to those of the part UUID 9803-0881 are found.

Figure 16:
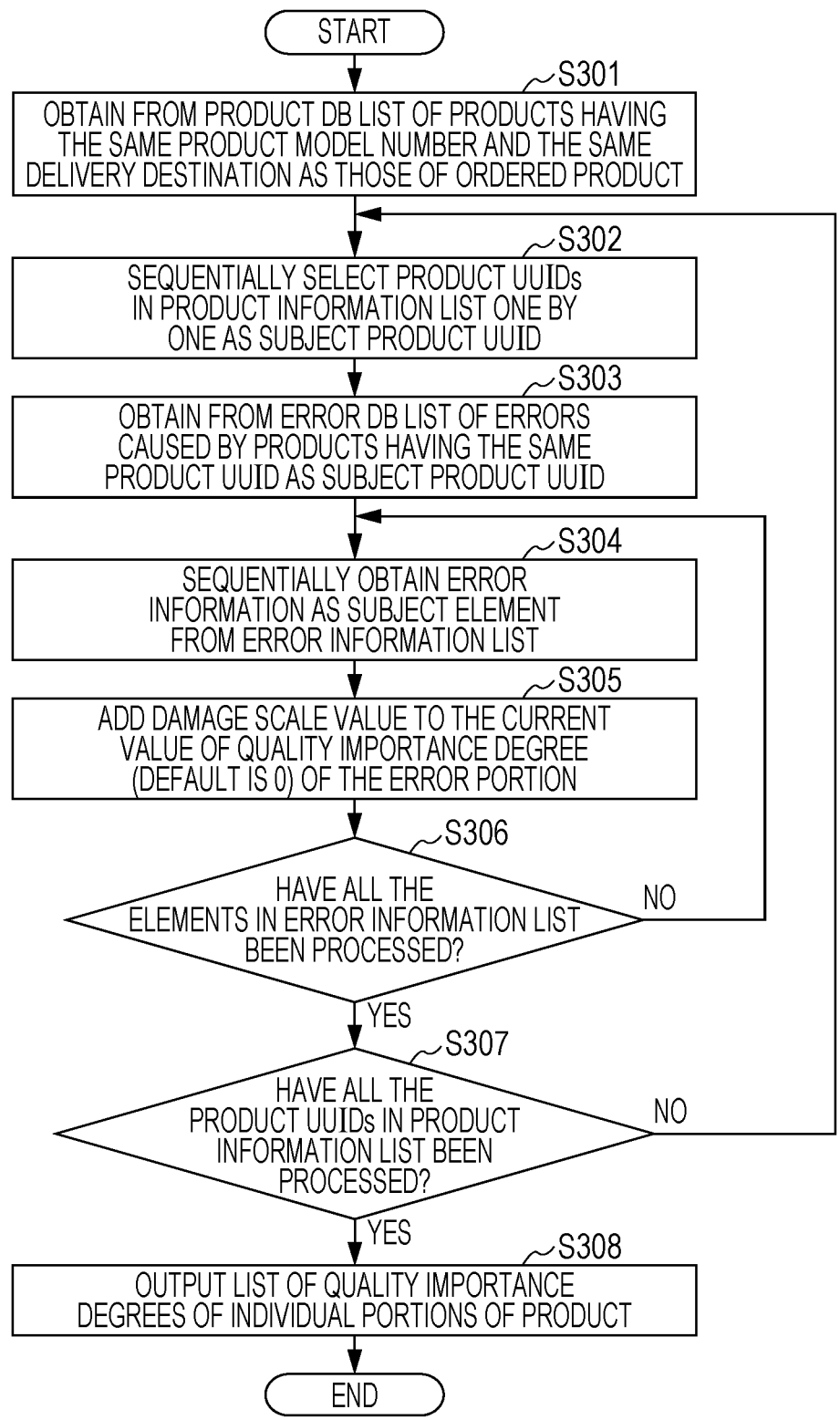
FIG. 16 is a flowchart illustrating an example of processing executed by a product-quality influence estimator according to the exemplary embodiment.

FIG. 16 is a flowchart illustrating an example of processing executed by the product-quality influence estimator 402 according to this exemplary embodiment.

The product-quality influence estimator 402 (see FIG. 10) is implemented as a result of the CPU 41A (see FIG. 9) executing the application program. The processing shown in FIG. 16 is executed when a customer has placed an order (input a product model number and a delivery destination).

In step S301, the product-quality influence estimator 402 obtains from the product DB 20 (see FIG. 10) a list of products (product information list) having the same product model number and the same delivery destination as those of an order received from a customer. In other words, products having the same product model number and the same delivery destination as those of the ordered product are extracted from the product DB 20.

In the processing shown in FIG. 16, two items of information, that is, the product model number and the delivery destination, are used to obtain a product information list. However, if the customer placed an order provides information concerning the usage environments for the product, it may also be used to obtain a product information list, thereby enhancing the precision in estimating the quality importance degrees of the individual portions of a product that are demanded for the product to be manufactured.

If no products having the same product model number and the same delivery destination as those of the ordered product are found, the product-quality influence estimator 402 obtains a blank list.

The processing shown in FIG. 16 is executed, assuming that products having the same product model number and the same delivery destination as those of the ordered product are found. If such products are not found, a step of judging whether the product information list is blank may be executed after step S301. If the product information list is found to be blank, the processing may be terminated at this stage. In this case, the ordered product is a product which will be delivered to the delivery destination for the first time.

If the delivery destination input by the customer is not found in the product information list, information concerning another delivery destination may be used to continue processing. In this case, the precision in estimating the quality importance degrees may be decreased. However, by estimating the quality importance degrees of the individual portions of the product by using similar cases, the possibility of the occurrence of errors, in particular, the occurrence of serious errors, may be reduced.

Then, in step S302, the product-quality influence estimator 402 sequentially selects product UUIDs in the obtained product information list one by one as a subject product UUID.

In step S303, the product-quality influence estimator 402 obtains from the error DB 30 a list of errors (error information list) caused by products having the same product UUID as the subject product UUID. If no errors are found, the product-quality influence estimator 402 obtains a blank list. If the list is blank, steps S304 through S306 may be skipped.

Then, in step S304, the product-quality influence estimator 402 sequentially obtains error information as a subject element from the error information list.

In step S305, the product-quality influence estimator 402 adds the damage scale value extracted from the error information concerning the subject element to the current value of the quality importance degree of the corresponding error portion.

In this exemplary embodiment, as the damage scale value, 3 is used for the damage scale "heavy", 2 is used for the damage scale "intermediate", and 1 is used for the damage scale "light". These values are only examples. The default value of the quality importance degree is 0.

The product-quality influence estimator 402 judges in step S306 whether all the elements in the error information list have been processed.

If the result of step S306 is NO, the product-quality influence estimator 402 returns to step S304 to select the subsequent element in the error information list and executes the above-described operations.

If the result of step S306 is YES, the product-quality influence estimator 402 judge in step S307 whether all the product UUIDs in the product information list have been processed.

If the result of step S307 is NO, the product-quality influence estimator 402 returns to step S302 to select the subsequent element in the product information list and executes the above-described operations.

If the result of step S307 is YES, the product-quality influence estimator 402 proceeds to step S308. In step S308, the product-quality influence estimator 402 outputs a list of the quality importance degrees of the individual portions of the product.

FIG. 17 illustrates lists for explaining an example of the processing executed by the product-quality influence estimator 402.

S301 through S305 indicated in FIG. 17 correspond to the operations in the corresponding step numbers in FIG. 16.

In FIG. 17, it is assumed that the model number of the ordered product is DEV101.

Two records of products having the product model number DEV101 are found in the product information list shown in FIG. 17. One of the products in the records is the product identified by the product UUID "DEV101-23", and the other product is the product identified by the product UUID "DEV101-08". These two products are obtained from the product DB 20 in step S301.

In the example in FIG. 17, error information is found for the product UUID "DEV101-23", which has the same model number "DEV101" as the products obtained in step S301. As the error information, the damage scale "heavy" and the error portion "S03-1" are obtained. In this case, the damage scale value "3" is calculated as the quality importance degree for the error portion "S03-1" forming the product identified by the product model number "DEV101".

FIG. 18 illustrates an example of the calculation results of the quality importance degrees according to this exemplary embodiment.

The list in FIG. 18 shows examples of the quality importance degrees concerning the individual portions of the image forming device using parts of the part model number P9803. The list in FIG. 18 is rearranged (sorted) in descending order of the quality importance degree.

In the example in FIG. 18, although parts of the same model number "P9803" are used for four portions, the quality importance degree is different according to the portion.

In the example in FIG. 18, the portion identified by S22-8 is estimated to have the highest quality importance degree, while the portion identified by S71-9 is estimated to have the lowest quality importance degree.

In this exemplary embodiment, the quality importance degree "4" means that one error incurred a heavy scale of damage has occurred and one error incurred a light scale of damage has occurred or that four errors incurred a light scale of damage have occurred.

As the quality importance degree of a certain portion is greater, the influence on the quality of a product if an error occurs to this portion is greater, that is, the quality of a part to be used in this portion is more influential.

Figure 19:
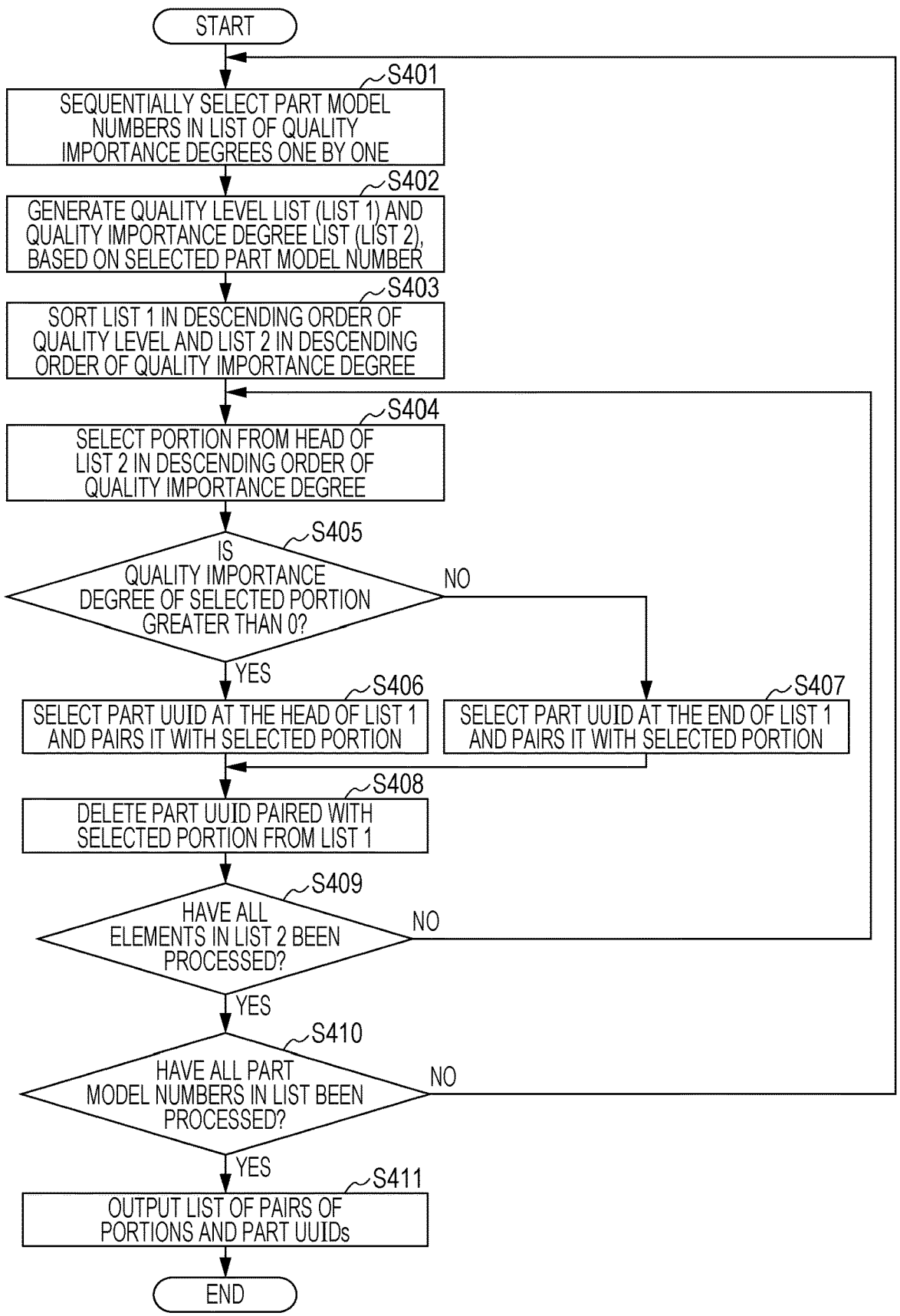
FIG. 19 is a flowchart illustrating an example of processing executed by a parts determining unit according to the exemplary embodiment.

FIG. 19 is a flowchart illustrating an example of processing executed by the parts determining unit 403 (see FIG. 10) according to this exemplary embodiment.

The parts determining unit 403 is implemented as a result of the CPU 41A (see FIG. 9) executing the application program. The processing shown in FIG. 19 is executed when the quality importance degrees are provided by the product-quality influence estimator 402.

In step S401, the parts determining unit 403 sequentially selects part model numbers in a list of quality importance degrees one by one as a subject model number. The parts determining unit 403 sequentially selects part model numbers P9803, P4533, and P6002, for example.

The number of part model numbers to be used in the individual portions of the product does not necessarily coincide with that in the list. Usually, more part model numbers are used in the individual portions of the product than those in the list.

Concerning a part model number that is not included in the list, past error records do not exist. Hence, regarding the part model number that is not included in the list, any parts of the part model number specified in a design specification are used regardless of the part UUIDs.

Then, in step S402, the parts determining unit 403 generates a quality level list (list 1) and a quality importance degree list (list 2), based on the part model number selected in step S401.

In step S403, the parts determining unit 403 sorts the list 1 in descending order of the quality level and sorts the list 2 in descending order of the quality importance degree.

The list shown in FIG. 15 corresponds to the list 1, while the list shown in FIG. 18 corresponds to the list 2.

In step S404, the parts determining unit 403 selects a portion of the product from the head of the list 2 in descending order as a subject element. That is, the parts determining unit 403 selects the portions of the product in descending order of the quality importance degree. In the example in FIG. 18, the portion identified by S22-8 is selected first.

The parts determining unit 403 then judges in step S405 whether the quality importance degree of the selected portion is greater than 0.

If the result of step S405 is YES, the parts determining unit 403 proceeds to step S406. In step S406, the parts determining unit 403 selects the part UUID at the head of the list 1 and pairs this part UUID with the portion selected in step S404. This operation means that, among the parts of the same model number, a part having a higher level of quality will be used for a portion which is more likely to influence the product quality in the case of the occurrence of an error.

If the result of step S405 is NO, that is, if the quality importance degree is 0, the parts determining unit 403 proceeds to step S407. In step S407, the parts determining unit 403 selects the part UUID at the end of the list 1 and pairs this part UUID with the portion selected in step S404. This operation means that, among the parts of the same model number, a part having a lower level of quality will be used for a portion which is less likely to influence the product quality in the case of the occurrence of an error.

Even a part having a lower level of quality satisfies the manufacturing standards (tolerance and allowance) specified by the part model number, and is not a defective part.

After step S406 or S407, in step S408, the parts determining unit 403 deletes the part UUID paired with the portion selected in step S404 from the list 1.

The parts determining unit 403 then judges in step S409 whether all the elements in the list 2 have been processed.

If the result of step S409 is NO, the parts determining unit 403 returns to step S404 to select another portion and executes the above-described operations.

If the result of step S409 is YES, the parts determining unit 403 proceeds to step S410.

The parts determining unit 403 then judges in step S410 whether all the part model numbers in the list of quality importance degrees are processed.

If the result of step S410 is NO, the parts determining unit 403 returns to step S401 to select another part model number and executes the above-described operations.

If the result of step S410 is YES, the parts determining unit 403 proceeds to step S411.

In step S411, the parts determining unit 403 outputs a list of the pairs of the selected portions and the selected part UUIDs.

FIG. 20 illustrates an example of a list output from the parts determining unit 403.

The list shown in FIG. 20 has been generated as a list of parts identified by the part model number P9803. In this example, parts of the part model number P9803 are used for four portions of the image forming device.

The left column of the list indicates the portion (position) of the image forming device, and the number in the parentheses represents the quality importance degree of the portion. The right column of the list indicates information concerning an individual part (part UUID) to be used for the corresponding portion among parts of the same part model number P9803. The number in the parentheses represents the quality level of the individual part.

The list in FIG. 20 shows that the part identified by the part UUID 9803-1102 having the highest quality level among the parts of the part model number P9803 in stock will be used for the portion identified by S22-8 having the highest quality importance degree.

Likewise, the list in FIG. 20 shows that the part identified by the part UUID 9803-2311 having the second highest quality level (the highest quality level at this stage) among the parts of the part model number P9803 in stock will be used for the portion identified by S03-1 having the second highest quality importance degree.

The list in FIG. 20 also shows that the part identified by the part UUID 9803-0881 having the lowest quality level among the parts of the part model number P9803 in stock will be used for the portion identified by S71-9 having a quality importance degree "0".

This means that the part having the lowest quality among the parts in stock will be paired with a portion for which no past error records are found.

Among the parts of the same part model number in stock, the part identified by the part UUID 9803-0881 is estimated to be a part that has been or will be placed under the environments where errors are most likely to occur. Nonetheless, even this part satisfies the quality in the manufacturing process that is required for the part model number P9803, and is unlikely to immediately cause an error in the product.

The list shown in FIG. 20 is displayed on the display device 44 (see FIG. 9) or is printed on a sheet by a printer (not shown), and is used for manufacturing a specific image forming device (product UUID DEV101-90, for example) ordered by a customer.

FIG. 21 illustrates an example of a list of unused parts.

The list in FIG. 21 has been generated as a list of parts identified by the part model number P9803. In this exemplary embodiment, five parts of the part model number P9803 have been in stock at the time of an order for manufacturing an image forming device, but only four parts have been used for manufacturing.

Accordingly, the list in FIG. 21 only indicates the part of the part UUID 9803-6221 having the fourth highest quality in stock as an unused part.

The part of the part UUID 9803-6221 will be used for manufacturing another product.

The list shown in FIG. 21 may not necessarily be output via the use of the display device 44 or a printer (not shown), or may not be generated at all.

By the use of the manufacturing support system 1 according to this exemplary embodiment, unlike a case in which the quality of a part is managed by a part model number, the quality of a part may quantitatively be estimated as a physically existing individual element.

Unlike a case in which the degree of influence of an individual portion of a product on the product quality is not evaluated, a portion of a product which is likely to influence the product quality may be estimated.

Using information concerning the estimated quality levels of individual parts and the estimated quality importance degrees of individual portions makes it possible to enhance the precision in estimating the future qualities of individual products.

Combinations of portions of a product and parts to be used for the corresponding portions may be determined so that, among parts of the same part model number in stock, a part having a higher level of quality will be applied to a portion which is more likely to influence the quality of a product. It is thus possible to decrease the possibility of the occurrence of errors regardless of where the delivery destination is or which type of product is manufactured.

A part having a lower level of quality is applied to a portion having a lower quality importance degree. Hence, even in the case of the occurrence of an error due to the low quality of this part, the damage scale caused by the error may be smaller than that of a case in which the quality of parts is managed only by a part model number.

Unlike a case in which parts estimated to have a higher level of quality are only used for manufacturing a product, parts having a lower level of quality are also actively used for manufacturing (used for a portion having a quality importance degree "0", for example). It is thus possible to enhance the effective use of parts which satisfy the standards in the manufacturing process while maintaining the quality of individual products. This is also effective in reducing the manufacturing cost.

Other Exemplary Embodiments

The exemplary embodiment of the invention has been discussed. However, the technical scope of the invention is not restricted to the above-described exemplary embodiment. Various modifications and improvements may be made to the above-described exemplary embodiment.

For example, in the above-described exemplary embodiment, among the parts in stock, the part having the lowest quality level is paired only with a portion having the quality importance degree "0" (see step S407 of FIG. 19). However, if a portion having a quality importance degree greater than 0 (a portion having a quality importance degree "1", for example) satisfies predetermined standards, the part having the lowest quality level among the parts in stock may be paired with such a portion.

In the above-described exemplary embodiment, the quality level of an individual part is calculated by counting the number of cases in which the environments linked with this part are similar to those of parts that have caused errors in a product. However, the quality level may be calculated by another calculation method. For example, the number of cases may be multiplied with a coefficient so that the resulting value will be proportional to the number of cases. Alternatively, as in the quality importance degree, the damage scale incurred by an error may be reflected in the quality level of an individual part.

In the above-described exemplary embodiment, the damage scale incurred by an error is reflected in the quality importance degree. More specifically, the numeric value is applied in increments of 1 according to the degree of damage. However, the quality importance degree may be calculated by another calculation method. For example, the increment may be increased according to the damage scale. For example, the increment for a heavier scale of damage may be greater than that for a lighter scale of damage.

In the above-described exemplary embodiment, a combination of a portion of a product and a part UUID (association between a portion and a part UUID) determined by the processing in FIG. 19 is fixed for use. Alternatively, a function of evaluating a determined combination (association) and judging whether the determined combination will be fixed for use may be provided in the parts determining unit 403.

For example, certain calculation may be made for a combination of the quality importance degree set for a portion of a product and the quality level set for a part UUID, and the calculated value may be evaluated based on certain conditions. It may be then judged whether a currently determined combination will be fixed for use. For example, if the quality importance degree and the quality level are added to each other, the determined combination may be fixed for use only when the added value is greater than a predetermined threshold. If the added value is smaller than or equal to the predetermined threshold, a new combination may be determined after new parts are added in stock.

In the above-described exemplary embodiment, the quality level that can be paired with the quality importance degree is not restricted by the magnitude of the quality importance degree. However, certain rules for determining combinations may be set. For example, for a portion having a high quality importance degree, parts of a quality level lower than a predetermined threshold may be excluded.

Setting of such a rule may avoid a decrease in the quality of a product to be manufactured. In particular, for a portion that is highly likely to incur a heavy scale of damage in the case of the occurrence of an error, a part having a predetermined quality level or higher is used. This makes it possible to reduce the possibility of the occurrence of an error which incurs a heavy scale of damage.

In the above-described exemplary embodiment, it is assumed that, regardless of the quality level, all the parts including parts of low quality will be used for manufacturing a product because they satisfy the manufacturing standards. However, parts that do not satisfy the predetermined quality standards may be excluded from the use for manufacturing a product.

For example, upon comparing the quality level of an individual part with a predetermined threshold, parts having a lower quality level (having a greater absolute value of the quality level) than the threshold may not be used for manufacturing.

Alternatively, among the parts of the same part model number in stock, the average of the quality levels of as many parts as those required for manufacturing a product may be calculated and compared with a predetermined threshold. If the absolute value of the average is greater than the threshold (in other words, if the average quality is low), it may be judged that the quality of the parts in stock is not suitable for manufacturing a product.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first estimator that estimates a quality of each individual part to be used for a product, based on error information concerning a manufactured product;
a second estimator that estimates a degree of an influence of each portion of a product on a quality of the product, based on the error information; and
a determining unit that determines, for each portion of the product, which part will be used for a corresponding portion of the product, based on the estimated quality and the estimated degree of an influence.

2. The information processing apparatus according to claim 1, wherein the first estimator refers to information concerning an environment linked with an individual part which has caused an error so as to estimate the quality of a subject part.

3. The information processing apparatus according to claim 2, wherein the information concerning an environment is at least one of information concerning an environment during a manufacturing process and information concerning an environment after the manufacturing process.

4. The information processing apparatus according to claim 3, wherein the information concerning an environment is constituted by at least one of information concerning manufacturing, information concerning transportation, information concerning storage, and information concerning usage.

5. The information processing apparatus according to claim 3, wherein the information concerning an environment is constituted by information concerning at least one of temperature, atmospheric pressure, humidity, acceleration, luminous intensity, magnetic force, and usage frequency.

6. The information processing apparatus according to claim 1, wherein the first estimator estimates the quality of a subject part, based on a distance between information concerning an environment linked with an individual part which has caused an error and information concerning an environment linked with the subject part.

7. The information processing apparatus according to claim 6, wherein, if the distance is shorter than a predetermined threshold, the first estimator estimates the quality of the subject part to be low.

8. The information processing apparatus according to claim 7, wherein the first estimator estimates a level of the quality based on the number of individual parts which have caused an error, the distance between information concerning an environment linked with each of the individual parts which have caused an error and the information concerning the environment linked with the subject part being found to be shorter than the predetermined threshold.

9. The information processing apparatus according to claim 1, wherein the second estimator refers to information concerning a portion in which an error has occurred and information concerning scale of the error so as to estimate the degree of an influence of a subject portion on the quality of a product.

10. The information processing apparatus according to claim 9, wherein, if a plurality of items of information concerning a plurality of errors are found for one portion, the second estimator estimates the degree of the influence of the subject portion, based on a plurality of items of information concerning scale of the plurality of errors.

11. The information processing apparatus according to claim 1, wherein the second estimator refers to information concerning a delivery destination of a product so as to estimate the degree of an influence of a subject portion on the quality of the product.

12. The information processing apparatus according to claim 1, wherein the determining unit determines association between a part and a portion so that a part estimated to have a higher level of the quality will be paired with a portion estimated to have a higher degree of the influence.

13. The information processing apparatus according to claim 12, wherein the determining unit determines the association in descending order of the degree of the influence.

14. The information processing apparatus according to claim 12, wherein the determining unit judges whether to fix the determined association, based on a result of evaluating a combination of a degree of the influence and a level of the quality associated with each other.

15. The information processing apparatus according to claim 1, wherein the determining unit outputs a list in which each portion of the product and an individual part to be used for a corresponding portion are linked with each other.

16. A non-transitory computer readable medium storing a program causing a computer to execute a process, the process comprising:
estimating a quality of each individual part to be used for a product, based on error information concerning a manufactured product;
estimating a degree of an influence of each portion of a product on a quality of the product, based on the error information; and
determining, for each portion of the product, which part will be used for a corresponding portion of the product, based on the estimated quality and the estimated degree of an influence.

17. An information processing system comprising:
a database in which error information concerning a manufactured product is collected and stored; and
an information processing apparatus that estimates a quality of each individual part to be used for a product, based on the error information, estimates a degree of an influence of each portion of a product on a quality of the product, based on the error information, and determines, for each portion of the product, which part will be used for a corresponding portion of the product, based on the estimated quality and the estimated degree of an influence.

* * * * *